United States Patent
Kancsár et al.

(10) Patent No.: US 11,641,020 B2
(45) Date of Patent: May 2, 2023

(54) PEM FUEL CELL

(71) Applicant: AVL LIST GMBH, Graz (AT)

(72) Inventors: János Kancsár, Vienna (AT); Christoph Kügele, Graz (AT); Stefan Jakubek, Vienna (AT)

(73) Assignee: AVL LIST GMBH, Graz (AT)

(*) Notice: Subject to any disclaimer, the term of this patent is extended or adjusted under 35 U.S.C. 154(b) by 949 days.

(21) Appl. No.: 16/473,145

(22) PCT Filed: Dec. 1, 2017

(86) PCT No.: PCT/EP2017/081122
§ 371 (c)(1),
(2) Date: Jun. 24, 2019

(87) PCT Pub. No.: WO2018/121957
PCT Pub. Date: Jul. 5, 2018

(65) Prior Publication Data
US 2022/0216488 A1     Jul. 7, 2022

(30) Foreign Application Priority Data
Dec. 30, 2016 (AT) ............................. A 51197/2016

(51) Int. Cl.
*H01M 8/04* (2016.01)
*H01M 8/04119* (2016.01)
*H01M 8/1018* (2016.01)
*H01M 8/10* (2016.01)

(52) U.S. Cl.
CPC ..... *H01M 8/04126* (2013.01); *H01M 8/1018* (2013.01); *H01M 2008/1095* (2013.01)

(58) Field of Classification Search
CPC ................. H01M 8/04126; H01M 8/1018
See application file for complete search history.

(56) References Cited

U.S. PATENT DOCUMENTS

| | | | |
|---|---|---|---|
| 2007/0214721 A1* | 9/2007 | Wootton | C01B 3/508 422/600 |
| 2013/0022883 A1 | 1/2013 | Lee et al. | |
| 2015/0155573 A1 | 6/2015 | Jo et al. | |
| 2016/0036076 A1* | 2/2016 | Fukumizu | H01M 8/04679 429/413 |

(Continued)

FOREIGN PATENT DOCUMENTS

| | | |
|---|---|---|
| DE | 10162202 A1 | 7/2003 |
| EP | 2639869 A1 | 9/2013 |
| JP | 2005044651 A | 2/2005 |

(Continued)

OTHER PUBLICATIONS

Korean Intellectual Property Office Examination Report issued in counterpart application No. 10-2019-7022379, dated Jun. 20, 2022.

*Primary Examiner* — Olatunji A Godo
(74) *Attorney, Agent, or Firm* — Dykema Gossett PLLC

(57) ABSTRACT

An apparatus is provided for conditioning at least one process gas which is supplied to at least one electrochemical converter, via at least one process gas supply. The process gas supply has a humidifying unit configured and arranged to introduce a humidifying agent into the process gas. Water in a supercritical state can be introduced as the humidifying agent.

12 Claims, 3 Drawing Sheets

(56) References Cited

U.S. PATENT DOCUMENTS

2016/0122882 A1* 5/2016 Oomura .................. C25B 9/73
  205/637
2017/0141416 A1  5/2017 Pandey et al.

FOREIGN PATENT DOCUMENTS

KR      100819969 B1    4/2008
WO      2007/117702 A2  10/2007

* cited by examiner

PEM FUEL CELL

CROSS-REFERENCE TO RELATED APPLICATIONS

This application is a national stage filing based upon International PCT Application No. PCT/EP2017/081122, filed 1 Dec. 2017, which claims the benefit of priority to Austria application No. A 51197/2016, filed 30 December 2016.

BACKGROUND

The invention relates to a method for conditioning at least one process gas which is supplied to at least one electrochemical converter, in particular a fuel cell, the process gas being humidified by a humidifying agent.

The invention also relates to a device for conditioning at least one process gas which is supplied to at least one electrochemical converter, in particular a fuel cell, via at least one process gas supply, the at least one process gas supply having a humidifying unit by means of which a humidifying agent can be introduced into the process gas.

to The invention also relates to an energy conversion unit for generating electrical energy from a first hydrogen-containing process gas and a second oxygen-containing process gas in at least one fuel cell, the first process gas being supplied to the at least one fuel cell via a first process gas supply and the second process gas being supplied to the at least one fuel cell via a second process gas supply.

In order to ensure the working order, efficiency and durability of fuel cells, in particular of low temperature PEM fuel cells (LT PEMFC), the process gases (hydrogen and air) have to be conditioned. In addition to the temperature, pressure and mass flow rate, the humidity is also adjusted depending on the operating point. Humidity plays a crucial role in this case, since only one aqueous membrane is permeable to hydrogen cations. High degrees of humidity are required in order to be particularly efficient. However, water droplets in the gas can obstruct the fine gas channels in the fuel cell, which leads to a shortage of reactants and therefore to reversible and irreversible performance losses (the latter also known as degradation). Moreover, the membrane swells when absorbing water and this process reverses during release, which is linked to mechanical stress. As a result of the greatly changed relative humidity of the process gases, cyclic swelling and de-swelling of the membrane can damage said membrane and again cause irreversible performance losses and therefore degradation.

Depending on the application—during operation (in a fuel cell system) or on a test stand—there are various methods for humidifying the reactants. Gas-gas membrane humidifiers comprising a sulfonated tetrafluoroethylene polymer are usually used in a fuel cell system. In this case, the exhaust gas of the fuel cell is guided past the process gas, separated by a Teflon membrane. Temperature and humidity of the two gases are equalized over the membrane. This method has a slow response time and poor controllability, and is therefore not suitable for use in a test stand, for example.

A further method, which is used primarily on stationary research test stands, uses what is referred to as a "bubbler". In this case, the gas is blown from below through a container comprising water in order to humidify the gas. This method is primarily suitable for establishing very constant humidity conditions; dynamic changes are almost impossible, however.

Other methods that have better response characteristics and better controllability and are primarily used for test stands are direct evaporation, water injection and directly introducing water vapor. In the first, water is sprayed onto a heated plate by a mass flow controller. The water evaporates and is subsequently added to the process gas. The good meterability of the water is advantageous in this case, since this is added in liquid form. However, the heated plate is inactive and has to be heated more or less strongly depending on the amount of water. Should the amount of water be increased too quickly, the plate can cool too much and the water begins to collect in the chamber. Moreover, there is downtime between water injection and vapor supply to the process gas, since the liquid water first has to be evaporated.

In water injection, water is atomized as finely as possible by means of a one or two component nozzle and supplied directly to the process gas. The good meterability is again advantageous, but the evaporation enthalpy has to be removed from the process gas itself. This means that the gas has to be greatly superheated in order to supply enough heat at a high relative humidity. In addition, the particle vaporization is dependent on the ratio of saturation partial pressure on the particle surface to water vapor partial pressure in the gas. The vaporization stops at equilibrium. In this case, the formation of water droplets cannot be prevented or can only be prevented with great difficulty.

In another approach, water vapor is generated in a boiler and this is then added to the process gas via valves. The high dynamics and short response time are advantageous, but the water vapor can only be metered with great difficulty.

Variants of the previously described methods are also known. Above all in dynamic operating conditions, all of these methods have disadvantages, it being possible for the formation of water droplets or poor control quality (overshoot or undershoot) of the humidity to lead to disadvantageous or damaging operating conditions for the fuel cell.

SUMMARY OF THE INVENTION

The problem addressed by the present invention is that of overcoming this and other disadvantages of the prior art.

According to the invention, the problem is solved by a method of the type mentioned at the outset, in which water in a supercritical state is used as a humidifying agent. By means of this method, the relative humidity of the process gases can be adjusted so as to have high control quality and fast response time. The method can be used for all electrochemical converters in which the humidification of process gases is necessary and the formation of droplets is intended to be prevented. The invention is particularly advantageous for fuel cells such as PEMFC, DMFC, PAFC, AFC, DMFC, SOFC or the like. The method according to the invention is particularly suitable for low temperature polymer electrolyte membrane fuel cells (LT PEMFC).

In one preferred embodiment, the supercritical water introduced into the process gas as the humidifying agent has a specific enthalpy of greater than 2800 kJ/kg. No liquid water is formed at all as a result in an isenthalpic expansion, since the corresponding isenthalpic lines extend completely outside the wet vapor region.

The humidifying agent can advantageously be introduced into a process gas supply via at least one humidifying unit comprising a substantially isenthalpic throttle which can optionally be designed as an injector. This allows quick injection that can be precisely controlled, it being possible for the amount of humidifying agent introduced via the throttle to be determined and controlled very precisely using a mass flow controller.

In the context of the present description, a reduction of the cross section in a flow channel is generally referred to as a throttle. For example, the throttle can be designed as an aperture, nozzle or injector. A hole comprising a non-rounded inlet and a generally conical outlet is referred to as an aperture. A nozzle has a changing cross section over the flow path, and an injector is a throttle, aperture or nozzle which can be closed and the cross section of which is optionally adjustable.

The aforementioned device for conditioning at least one process gas solves the problem addressed by the invention in that water in a supercritical state can be introduced into the process gas as a humidifying agent. The water can be allowed to flow in continuously for example via a throttle, it being possible to control the amount of inflowing water by means of the pressure.

The humidifying unit can advantageously have an injector that opens into the process gas supply. In so doing the injection amount can be precisely metered. The metering can be converted in a similar manner to that which occurs in internal combustion engines comprising a common rail system. The injection amount can be metered, for example, using opening and closing times that are intermittent at an opening frequency. However, in order to be able to ensure continuous supply of humidifying agent, a plurality of injectors can also be provided which each open into the same process gas supply. Actuation can in this case be carried out in a temporally offset manner such that the same amount of humidifying agent always flows in.

The energy conversion unit according to the invention has a device described above.

In the energy conversion unit, a plurality of fuel cells can advantageously be arranged in at least one cell block, it being possible for the first process gas supply and/or the second process gas supply to each be associated with a plurality of fuel cells of the cell block.

BRIEF DESCRIPTION OF THE DRAWINGS

The present invention is described in greater detail in the following with reference to FIGS. 1 to 3, which show exemplary, schematic and non-limiting advantageous embodiments of the invention. In the drawings.

DETAILED DESCRIPTION

Figure 1:
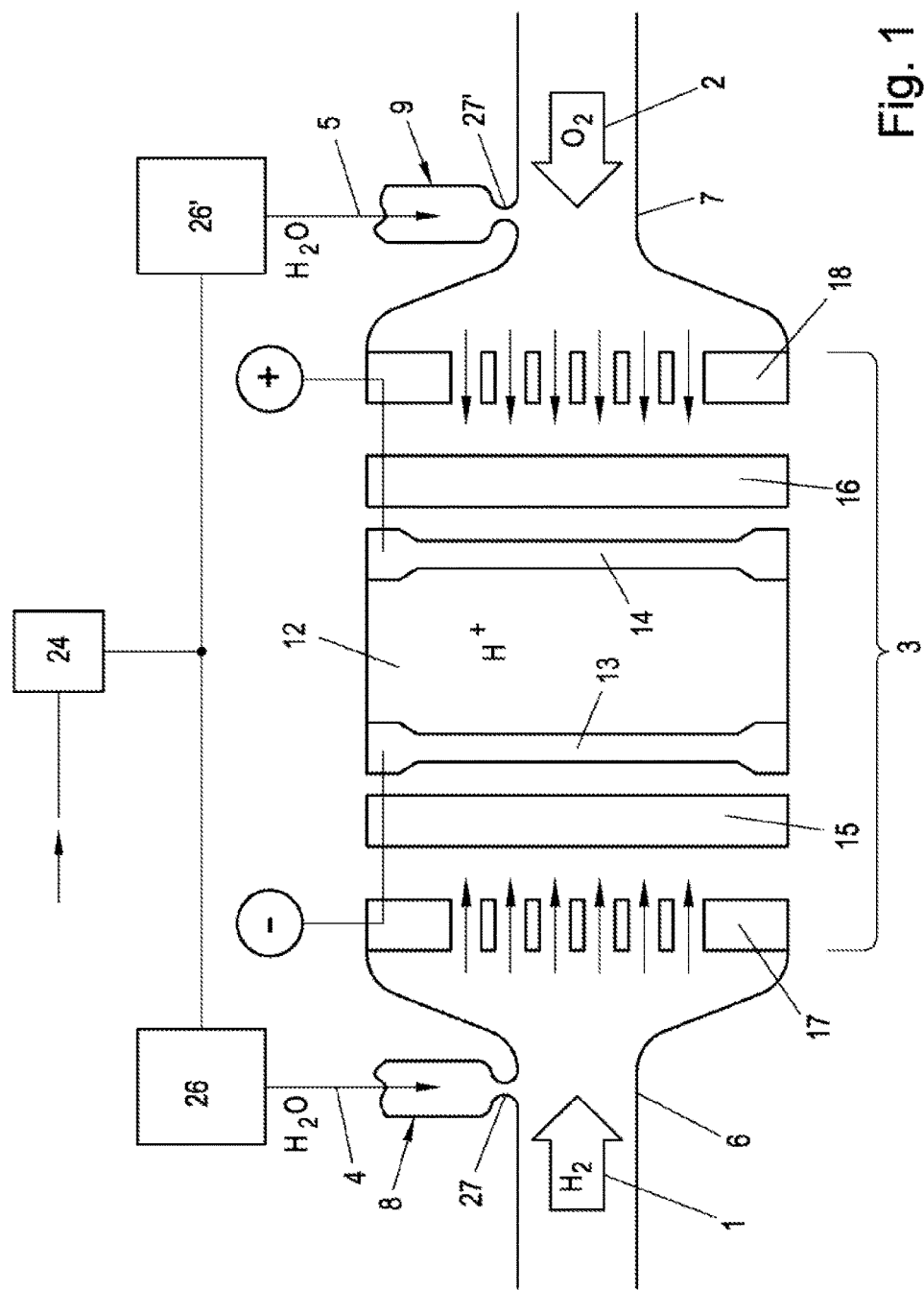
FIG. 1 is a schematic view of a fuel cell comprising a device according to the invention.

With reference to FIG. 1, the properties and design of a fuel cell 3 are described in general and specifically in the context of the present invention.

The fuel cell 3 shown schematically in FIG. 1 is a PEM fuel cell (polymer electrolyte membrane fuel cell, PEMFC) which is also referred to as a solid polymer fuel cell (SPFC) or a polymer electrolyte fuel cell (PEFC). Depending on the electrolyte used, the fuel cell 3 operates in the temperature range of from room temperature up to approximately 80° C., with temperature peaks of up to 95° C. (low temperature PEMFC or LT PEMFC) or from 130 to 200° C. (high temperature PEMFC or HT PEMFC) being possible in the short term. There is also an MT PEMFC (mid-temperature PEMFC) between HT PEMFC and LT PEMFC. This operates in temperature ranges of approximately 100° C.-130° C. However, the crossovers between these types of fuel cells are blurred, and therefore a sharp differentiation is not always possible.

The fuel cell 3 substantially consists of a central proton-conducting membrane 12, on the first lateral surface of which (this is the hydrogen side—shown in FIG. 1 on the left-hand side) an anode 13 is arranged, and on the opposite second lateral surface of which a cathode 14 is arranged.

On the side of the anode 13, by means of a first process gas supply 6, a first process gas 1 is supplied via a first distribution unit 17 and a first gas diffusion layer 15 of the anode 13. The first process gas 1 (reactant) is hydrogen or a hydrogen-containing gas, for example. Hydrocarbon compounds (ethanol, methanol, methane, natural gas, etc.) can also be supplied. For this purpose, internal (in the fuel cell) or external (as a separate unit) reformation of the hydrogen is necessary.

On the side of the cathode 14, by means of a second process gas supply 7, a second process gas 2 is supplied via a second distribution unit 18 and a second gas diffusion layer 16 of the cathode 14. The second process gas 2 is or contains oxygen. For example, air can be used as the second process gas 2.

In order to humidify the first process gas 1, a first humidifying unit 8 is provided on the first process gas supply 6, by means of which unit a first humidifying agent 4 can be introduced into the flow of the first process gas 1 in a metered manner. Likewise, in order to humidify the second process gas 2, a second humidifying unit 9 is provided on the second process gas supply 7, by means of which unit a humidifying agent 5 can be introduced into the flow of the first process gas 1 in a metered manner.

According to the invention, supercritical water is used as the first humidifying agent 4 and/or to second humidifying agent 5, which water can be provided to the humidifying units 8, 9 by at least one water treatment unit 24. The water treatment unit 24 brings water into a supercritical state and provides it to the humidifying units 8, 9. Ultrapure water is preferably used to prevent impurities from damaging the fuel cells or the water treatment unit. The amount of supercritical water output by the humidifying units 8, 9 can be determined by means of measuring apparatuses 26, 26'. Alternatively to this central water treatment, the water can also be brought to a supercritical state in a decentralized manner for each humidifying unit.

The humidifying agent flows into the relevant process gas supply 7, 8 via a throttle 27, 27', it being possible to optimize the form of the throttle 27, 27' as required, for example in the form of an aperture, nozzle or as an injector. The inflow process via the throttle 27, 27' can be referred to as substantially isenthalpic.

In the context of the present disclosure, the unit consisting of the proton-conducting membrane 12, first gas diffusion layer 15, second gas diffusion layer 16, first distribution unit 17 and second distribution unit 18 is referred to as a fuel cell 3. As is already known to a person skilled in the art, a plurality of fuel cells 3 can be combined to form a cell block 11, it being possible for one cell block 11 consisting of a plurality of fuel cells 3 to have a common first process gas supply 6 and a common second process gas supply 7.

Figure 2:
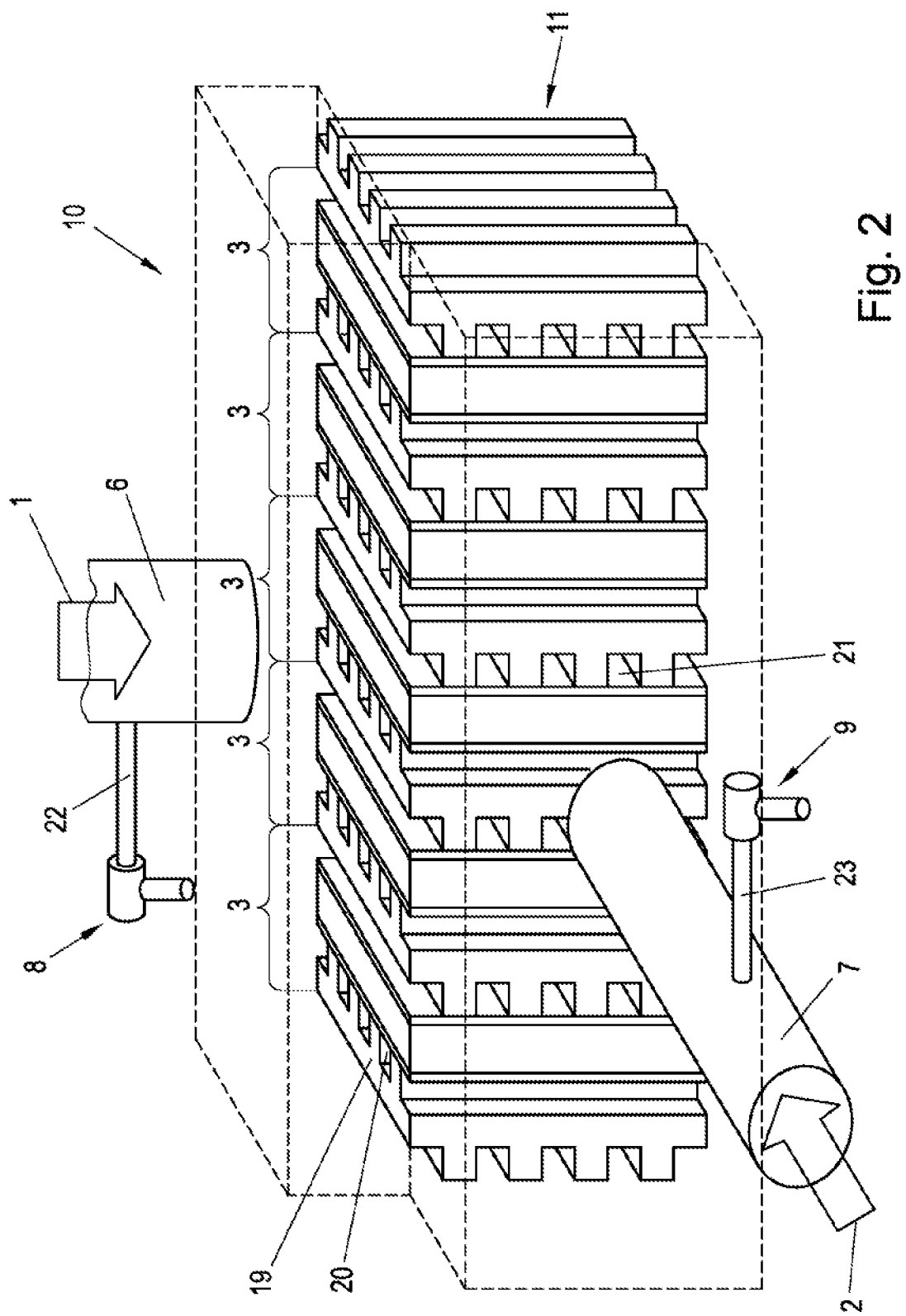
FIG. 2 is a schematic view of a cell block 11 that is provided with a device according to the invention and consists of a plurality of stacked fuel cells and FIG. 3 is a T-S diagram for water.

FIG. 2 is a schematic view of a cell block 11 of this kind consisting of a plurality of fuel cells 3. The respective distribution units 17, 18 between two fuel cells 3 resting against one another are designed, in a manner known per se, as bipolar plates 19 which have flow grooves on each side, in which grooves the relevant process gas 1, 2 is conveyed to the gas diffusion layers 15, 16 that are arranged adjacently. Coolant channels can also optionally extend in the bipolar plates 19; however, these channels are not shown in FIG. 2 for the sake of clarity. The first process gas 1 is introduced into the flow grooves 20 which extend from top to bottom in FIG. 2, and the second process gas 2 is introduced into the flow grooves 21 which extend horizontally in FIG. 2 and which are located on each bipolar plate 19 on the opposite side to the vertical flow grooves 20. The unit consisting of the cell block 11 together with the process gas supplies 6, 7 and humidifying units 8, 9 provided thereon forms an energy conversion unit 10.

According to the invention, supercritical water is injected into the flow of the relevant process gas by the two humidifying units 8, 9 as a first and second humidifying agent 4, 5. The throttles of the humidifying units 8, 9 are designed as injectors 22, 23, as a result of which the amount of introduced humidifying agent 5 can be quickly controlled and scaled.

The following conditions should be taken into account very generally when humidifying process gases 1, 2:

Liquids can be metered better than gases.

Energy is taken from the surroundings (endothermic reaction) during the phase transition from the liquid to gaseous physical state, referred to as evaporation.

The evaporation enthalpy is a function of the temperature and decreases as the temperature increases.

At the critical point, the evaporation enthalpy =0.

Evaporation can occur by means of boiling or vaporizing.

A liquid is vaporized when the temperature-dependent saturation vapor pressure of the substance in the surrounding gas is higher than the current partial pressure of this substance in the gas.

Boiling occurs when the temperature-dependent saturation vapor pressure of the liquid is higher than the pressure of the surrounding gas phase.

Liquid and gaseous water exist alongside one another in the wet vapor region.

In the present method, supercritical water (SCW) is added directly to the process gases of the fuel cell via an injector 22, 23. In so doing, said water immediately (i.e. without an enthalpy change being necessary for this purpose) converts into the gaseous state without liquid water, for example in the form of water droplets, being formed in the process.

In this case, two circumstances are used: Firstly, the density of supercritical water can be easily determined such that the meterability of supercritical water is comparable to the meterability of liquid water. The density of supercritical water is approximately between that of liquid and that of gaseous water, and therefore methods such as the Coriolis mass flow measuring principle can be used for measurement, which methods achieve better measurement results at higher media densities and are therefore advantageous for the higher density.

Secondly, the enthalpy increase for evaporating the water is already "stored" in the internal energy of the supercritical water. During isenthalpic relaxation of the supercritical water into the process gas, said water transitions directly into the gas phase, and the region of wet vapor is avoided.

Figure 3:
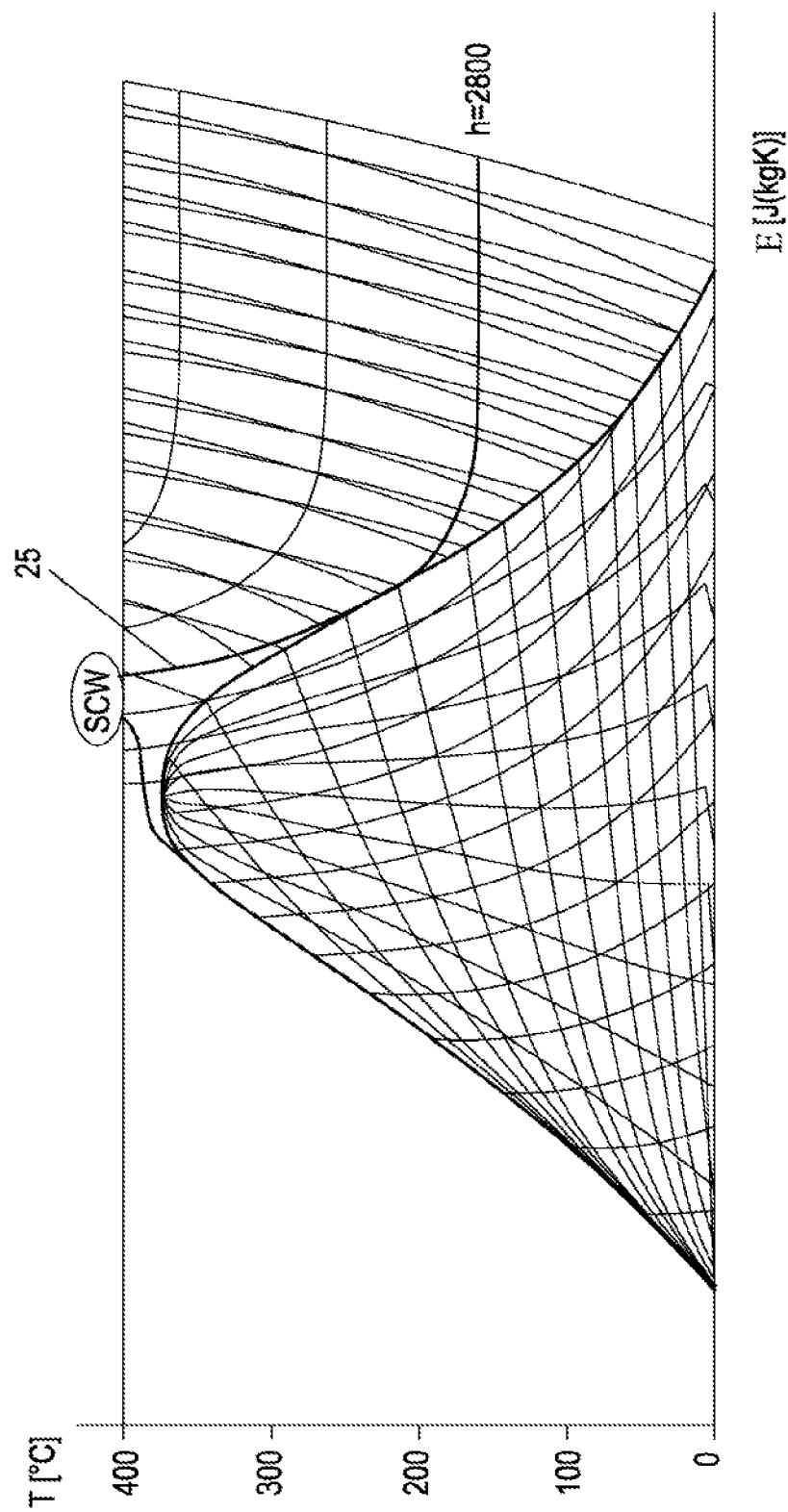

This isenthalpic relaxation is shown in FIG. 3, which is a T-S diagram of water. Proceeding from a supercritical state of the water (SCW), the relaxation extends along an isenthalpic line 25. At an enthalpy of approximately greater than 2800 kJ/kg, this isenthalpic line 25 extends completely outside the wet vapor region, and therefore no liquid water forms at all during relaxation of the water, i.e. during the transition from the supercritical to gaseous physical state.

The region of the water above the critical point (which is on the upper summit of the wet vapor range in the T-S diagram) is generally referred to as the supercritical state. According to common definition, water is in the supercritical state if it has a temperature of greater than 647 K and a pressure of greater than 22.1 MPa.

The injection amount can be controlled in a conventional manner. For example, the injection amount can be controlled on a characteristic diagram basis, using linear controllers and/or by means of non-linear model-based sets of rules.

LIST OF REFERENCE NUMERALS first process gas 1
second process gas 2
fuel cell 3
first humidifying agent 4
second humidifying agent 5
first process gas supply 6
second process gas supply 7
first humidifying unit 8
second humidifying unit 9
energy conversion unit 10
cell block 11
proton-conducting membrane 12
anode 13
cathode 14
first gas diffusion layer 15
second gas diffusion layer 16
first distribution unit 17
second distribution unit 18
bipolar plate 19
flow groove 20, 21
injector 22, 23
water treatment unit 24
isenthalpic line 25
measuring apparatus 26, 26'
throttle 27, 27'

The invention claimed is:

1. A method for conditioning at least one process gas containing oxygen or hydrogen, which is supplied to a fuel cell, the method including the following steps:
humidifying the at least one process gas by a humidifying agent, characterized in that water in a supercritical state is used as the humidifying agent, wherein an isenthalpic relaxation of the water in the supercritical state takes place in the at least one process gas, and wherein the supercritical water avoids the region of wet vapor and transitions directly into a gas phase, in order to form no liquid water during relaxation of the supercritical water.

2. The method according to claim 1, characterized in that the supercritical water introduced into the at least one process gas as the humidifying agent has a specific enthalpy of greater than 2800 kJ/kg.

3. The method according to claim 1, wherein the step of humidfying the at least one process gas further includes introducing the humidifying agent into a process gas supply via at least one humidifying unit including a substantially isenthalpic throttle.

4. An apparatus for conditioning at least one process gas containing oxygen or hydrogen which is supplied to at least one fuel cell, the apparatus comprising:
at least one process gas supply including a humidifying unit configured and arranged to introduce a humidifying agent into the at least one process gas, wherein the humidfying agent is water in a supercritical state, wherein the supercritical water introduced into the process gas avoids the region of wet vapor by means of an isenthalpic relaxation and transitions directly into the gas phase, in order to form no liquid water during relaxation.

5. The apparatus according to claim 4, characterized in that the humidifying unit includes an injector which opens into the at least one process gas supply.

6. An energy conversion unit for generating electrical energy from a hydrogen-containing first process gas and an oxygen-containing second process gas in at least one fuel cell, the energy conversion unit comprising:
- a first process gas supply configured and arranged to supply the first process gas to the at least one fuel cell; and
- a second process gas supply configured and arranged to supply the second process gas to the at least one fuel cell; and
- a humidifying unit configured to introduce water in a supercritical state into at least one of the first and second process gases.

7. The energy conversion unit according to claim 6, wherein the at least one fuel cell is a plurality of fuel cells arranged in at least one cell block, the first process gas supply and/or the second process gas supply each being associated with the plurality of fuel cells of the cell block.

8. The method of claim 1, wherein the at least one electrochemical converter is a fuel cell.

9. The method of claim 2, wherein the step of humidfying the at least one process gas includes introducing the humidifying agent into a process gas supply via at least one humidifying unit comprising a substantially isenthalpic throttle.

10. The method of claim 9, wherein the substantially isenthalpic throttle is an injector.

11. The method of 3, wherein the substantially isenthalpic throttle is an injector.

12. The energy conversion unit of claim 6, wherein the humidifying unit further includes an injector which opens into the at least one of the first and second process gas supply.

* * * * *